July 1, 1930.   J. D. WOOD   1,769,560
ELECTRICAL DISTRIBUTION SYSTEM AND SECTIONALIZING SWITCH THEREFOR
Filed Feb. 26, 1925   2 Sheets-Sheet 1

Inventor.
Joseph D. Wood
by
Greenwood
atty

July 1, 1930.    J. D. WOOD    1,769,560
ELECTRICAL DISTRIBUTION SYSTEM AND SECTIONALIZING SWITCH THEREFOR
Filed Feb. 26, 1925    2 Sheets-Sheet 2

Inventor,
Joseph D. Wood

Patented July 1, 1930

1,769,560

UNITED STATES PATENT OFFICE

JOSEPH D. WOOD, OF WOLLASTON, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS

ELECTRICAL DISTRIBUTION SYSTEM AND SECTIONALIZING SWITCH THEREFOR

Application filed February 26, 1925. Serial No. 11,865.

This invention relates to electrical distribution systems which are divided into a plurality of sections with switches controlling the connections between the sections.

When a fault develops in a section of a distribution system, it is desirable to isolate that section from the system, and maintain energized the remainder of the system; and it is an object of this invention to provide a sectionalizing switch adapted to connect together two adjacent sections, with means operated upon the occurrence of a fault in one of the sections to keep the switch open and thereby keep the faulty section isolated from the system.

A further object of the invention is the provision of an automatically reclosing switch having means controlled by the conditions of the circuit on both sides of it to govern the reclosing thereof.

A further object of the invention is the provision of means to apply a test potential to one section from the other section while maintaining the sections electrically independent.

A further object is generally to improve the construction and operation of electric switches and electric distribution systems.

Figure 1:
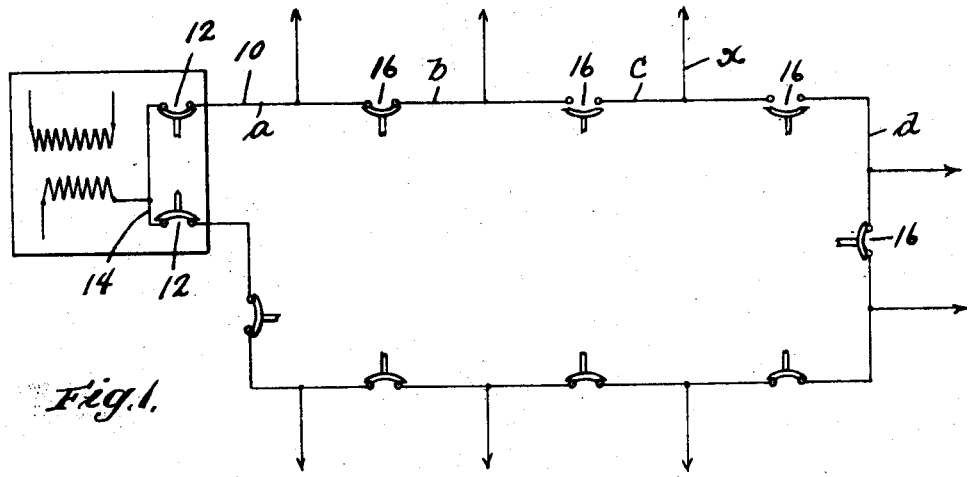
Fig. 1 is a diagrammatic representation of one line or phase of a multi-phase sectionalized distribution system with which this invention may be associated.

Fig. 1 illustrates one phase or line of a sectionalized distribution system wherein the line conductor 10 is extended in a loop throughout the district served by the system and the terminals of the loop are connected at the sub-station through switches 12 with a common bus 14. The conductor may be composed of a plurality of sections $a$, $b$, $c$, $d$, etc.; and the sections are adapted to be connected normally in series by automatically-reclosing sectionalizing switches 16. The sectionalizing switches 16 are adapted only to disconnect the line and preferably are not intended to interrupt current. Said switches are adapted to open automatically upon a reduction or failure of potential at the switches. The circuit interrupters 12 are adapted to interrupt the current.

The operation of such a system may be substantially as follows: If a fault, as a short circuit, develops in section $c$, for instance, thereby to produce an overload in that section and consequently on the line, both circuit interrupters 12 at the station are adapted to open, thereby isolating the line from the bus. As the line is now unenergized and has no potential upon it, all of the section switches are adapted to open. Retarding means preferably is associated with the undervoltage mechanism, whereby to delay the opening of the sectionalizing switches until after the circuit-interrupters 12 have opened.

The circuit interrupters 12 are then closed by any suitable means, thereby placing potential upon the first sections. When potential is established on the first sections, the first section switches are closed by their reclosing mechanisms, thereby placing potential upon the second sections. The second section switches now close, and establish potential on the next sections, and so on through the system to the faulty section.

In accordance with this invention, the switches are provided with means to maintain them open for so long as a fault exists on the sections associated with them. If the fault exists, the switch at the faulty section will not be closed and the faulty section thereby will be isolated from the remainder of the line, although the remainder of the line will be energized as two separate conductors.

Figure 3:
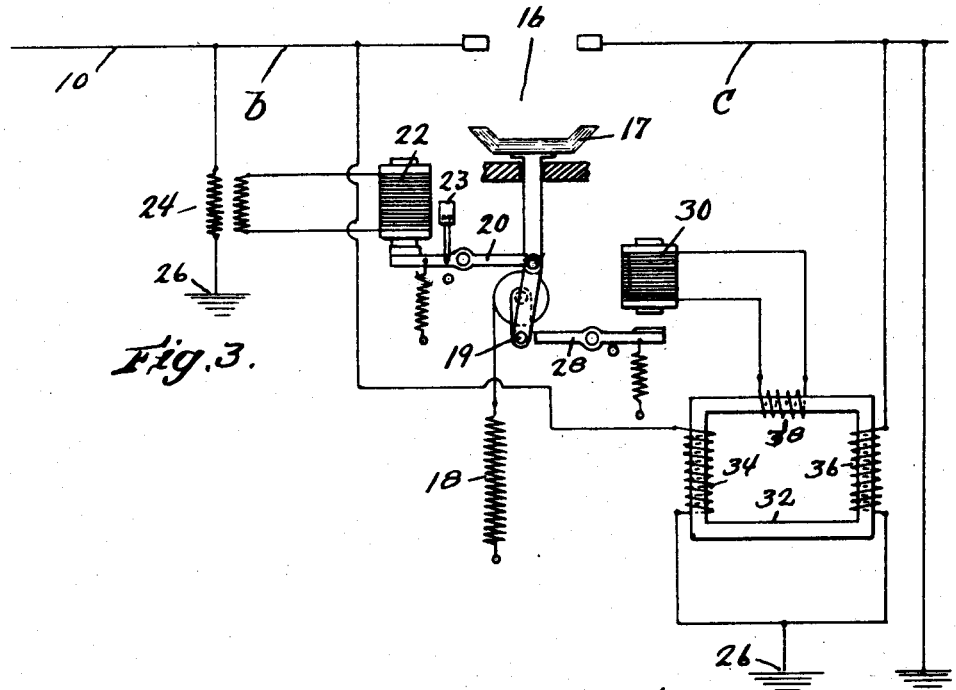
Fig. 3 is a diagrammatic view illustrating a modified arrangement of the invention.

The section switches may be automatically reclosed in any suitable manner. The circuit-section connecting means, or bridging member 17, of the switch may be connected with a crank shaft 19 which is biased for rotation always in one direction by a power device as a spring 18, which spring tends continually to rotate the crank shaft in one direction. The switch may be held in closed position by a pivoted latch 20 which is adapted to be engaged by the crank shaft at, say, the top part of its stroke. Said latch may be actuated by an under-voltage coil or electromagnet 22. A retardation device 23, of any suitable character, may be associated with said latch whereby to delay the opening of the switch until after the circuit interrupters at the substation have opened, thereby to prevent the sectionalizing switch from interrupting the circuit under load. As shown in Fig. 3 said under-voltage coil may be energized from the secondary of a potential transformer 24, one end of the primary of which is connected to one of the sections, as the section $b$, and the other of which is connected to ground 26 or to a common return conductor of the transmission system, which return conductor may be the neutral of a three-phase distribution line, which neutral ordinarily is grounded. Said under-voltage coil 22 is adapted continuously to be energized for so long as the section $b$ is energized at approximately normal potential, whereby to maintain said latch 20 in the path of rotation of the crank shaft 19 and thereby to hold the switch closed. Upon sufficient reduction or complete failure, of the potential on section $b$, said latch 20 is moved out of the path of movement of the crank shaft 19 in any suitable manner and the crank shaft is thereby caused to rotate under action of its power mechanism 18 whereby to open the switch.

The crank shaft is adapted to be restrained at the bottom of its stroke, or in opening position of the switch, by a second latch 28, which latch is disposed normally in the path of movement of the crank shaft and occupies a position approximately diametrically opposite the under-voltage latch 20. A closing coil or electro-magnet 30 is associated with said closing latch 28 and said coil is arranged, when energized, to move said closing latch out of the path of movement of the crank shaft, thereby permitting said crank shaft to make a second half revolution and close the switch.

Energization of said closing coil 30 is governed by means with which this invention is more particularly concerned, which means is controlled by the current conditions in at least one and preferably both of the sections controlled by the switch. Said means comprises a transformer core 32 having an energizing primary coil or winding 34 on one leg and a second and similar coil or winding 36 on another leg. A secondary winding 38 is wound about the core between said two windings and is connected with closing coil 30 and serves operatively to energize said coil under normal conditions in the associated sections. Similar terminals of said coils 34 and 36 are connected together and to the ground 26 while the free terminal of the winding 34 is connected to the section $b$ and the free terminal of the other winding 36 is connected to the section $c$, such connection being across the fixed terminals of the sectionalizing switch 16.

Under conditions of normal potential on one winding and normal load conditions on the section associated with the other winding, either of said windings 34 and 36 is arranged to supply sufficient energy through the secondary winding 38 to the closing coil 30 to operate it and effect the closing of the switch. Ordinarily the section $b$ is adapted to be the first switch-section energized and, consequently, winding 34 will have potential applied across its terminals and thereby be energized first, while section $c$ and winding 36 will not be energized. If section $c$ is clear of a condition which establishes an abnormal current flow thereon as, for instance, it is clear of a short-circuit and its connected load resistance is above a predetermined value, sufficient magnetic flux will be set up in the core 32 and the secondary winding 38 to energize the closing coil 30 and the switch 12 will thereupon be closed and potential established upon the section $c$. If, however, the section $b$ is energized and a fault, as a short circuit, exists on section $c$, as at $x$, the terminals of the winding 36 will be practically short-circuited, or shunted by a low resistance conducting path through the short-circuit bridge. Due to transformer action in the core 32, a relatively high current will be established in winding 36 from energy supplied from section $b$ through winding 34. The magnetic reaction of the short-circuit current in winding 36 with respect to the magnetizing effect of winding 34 is such that it reduces materially the amount of magnetic flux threading through the core 32 and the secondary winding 38, forcing the magnetic flux set up by winding 34 to take an air path rather than the path through the core. The consequent effect of the short-circuit current in the winding 36 is to alter, and weaken, the magnetic coupling between the energizing winding 34 and the secondary winding 38. Due to the reduced flux in core 32, the current set up in the secondary winding 38 is reduced and the amount of such reduction is designed to be such that the closing coil will not be sufficiently energized to effect the closing of the switch. The section $c$, therefore, will remain isolated from section $b$ for so long as the fault exists upon the section $c$.

It appears desirable that all transformer windings be isolated from each other as shown and separated by an air path of substantial length whereby the leakage air paths of the windings under an approximate short circuit condition of one primary winding will be largely isolated, so that the other windings will not react detrimentally upon each other under such conditions.

Figure 4:
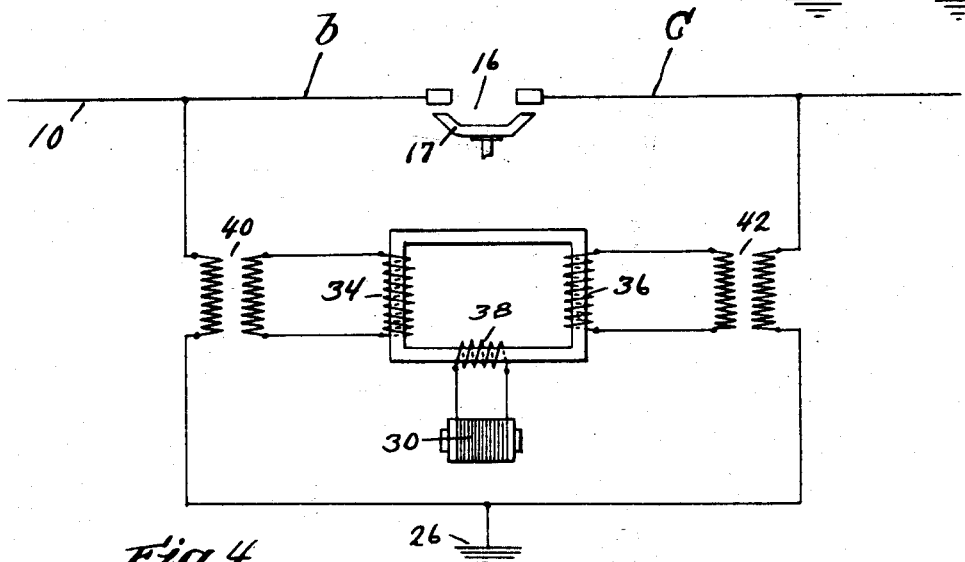
Fig. 4 is a view similar to Fig. 2 but showing the use of potential transformers to energize the sectionalizing switch governing transformer.

In Fig. 4 the coils 34 and 36 are energized through potential transformers 40 and 42 from the sections c and b instead of directly as shown in Fig. 3, and this arrangement may be desirable under some conditions.

Figure 2:
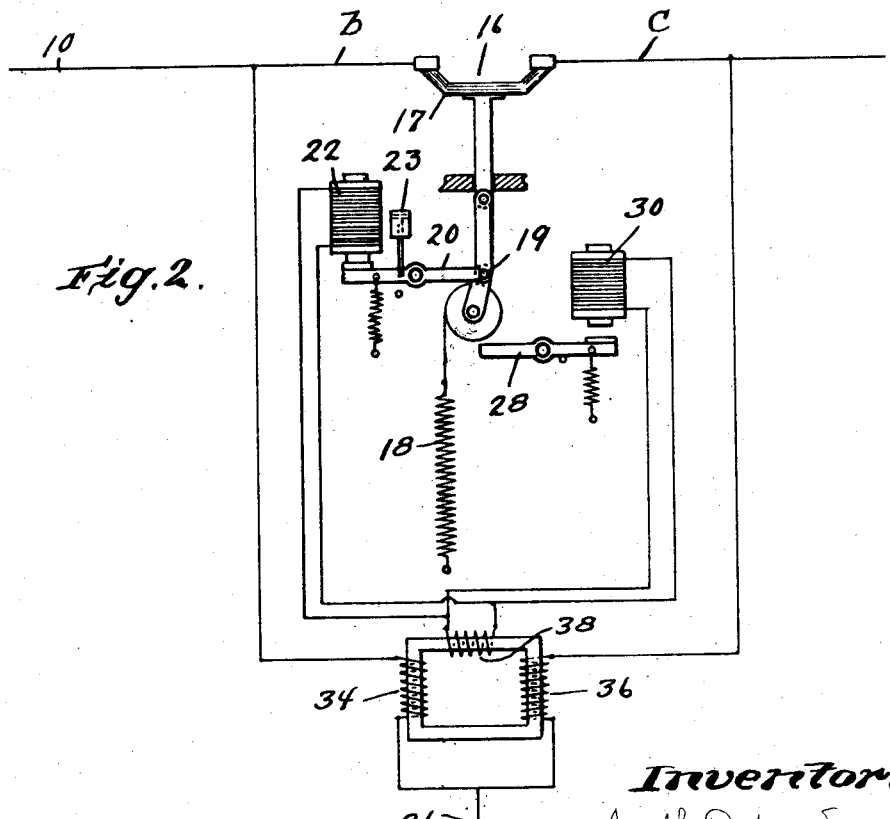
Fig. 2 is a diagrammatic representation of a sectionalizing switch embodying the invention.

Fig. 2 is essentially the same as Fig. 3 except that the undervoltage coil 22 is energized directly from the secondary winding 38 of the transformer instead of from a separate transformer. As thus arranged, the switch, under normal conditions, may close and be held closed regardless of the particular sequence in which the sections of the system are energized. The action, however, is essentially the same as in the apparatus of Fig. 3.

The coils 34 and 36 serve to apply a test potential to either section, when one of the sections is energized, and without electrically connecting the sections, whereby to test out the condition of the section prior to connecting them electrically.

I claim:

1. The combination of a pair of circuit-sections, a switch for connecting said sections, a closing device for the switch, transformer-structures connected with both circuit-sections interconnected reactively with each other and with said closing device to operate said device to close the switch when there is normal potential on one section and the other section is clear of a condition which establishes an abnormal current flow therein.

2. The combination of a sectionalizing electric switch having means for connecting two electrically independent circuit-sections, and means controlling said connecting means including a transformer associated with both the electrically independent circuit-sections arranged to render said connecting means effective when one circuit-section is energized at approximately normal potential and the other circuit is clear of a condition which establishes abnormal current flow therein.

3. The combination of an electric switch having means for connecting two electrically independent circuit-sections, and means controlling said connecting means including a transformer having windings one of which comprises a secondary for the other controlled by conditions in both the electrically independent circuit-sections and arranged to render said connecting means effective when one circuit-section is energized at approximately normal potential and the other circuit is clear of a condition which establishes an abnormal current flow in it.

4. The combination of an electric switch having means for connecting two electrically independent circuit-sections, and means controlling said connecting means including a transformer controlled by conditions in both said electrically independent circuit-sections and arranged to render said connecting means effective when either section is energized at approximately normal potential and the other section is free from a condition which establishes an abnormal current flow in it.

5. The combination of an electric switch having means for connecting two circuit-sections, and means controlling said connecting means including a transformer having energizing windings each associated with a section and arranged to render said connecting means effective when either section is energized at approximately normal potential and the other section is free from a condition which establishes an abnormal current flow in it.

6. The combination of an electric switch having means for connecting two circuit-sections, and means controlling said connecting means including a transformer having energizing windings each of which is influenced by the potential in a section and arranged to render said connecting means effective when either section is energized at approximately normal potential and the other section is free from a condition which establishes an abnormal current flow in it.

7. The combination of an electric switch having means for connecting two circuit-sections, and means controlling said connecting means including a transformer having an energizing winding for each section and a third winding influenced by both of said energizing windings, and arranged to render said connecting means effective when either section is energized at approximately normal potential and the other section is free from a condition which establishes an abnormal current flow in it.

8. The combination of an electric switch having means for connecting two circuit-sections, and means controlling said connecting means including a transformer having a core, energizing windings for said sections separately spaced on said core and a third winding also separably spaced on said core and influenced by both of said energizing windings, said controlling means arranged to render said connecting means effective when either section is energized at approximately normal potential and the other section is free from a condition which establishes an abnormal current flow in it.

9. The combination of an electric switch having means for connecting two electrically independent circuit-sections, reclosing means for the switch including a closing coil, and controlling means for said reclosing means including a transformer having an actuating winding for said closing coil governed by conditions in both electrically independent circuit sections and arranged to effectively control said closing coil when either circuit-section is energized at substantially normal potential and the other circuit section is clear of a condition which establishes an abnormal current flow in it.

10. The combination of an electric switch having means for connecting two circuit-sections, reclosing means for the switch including a closing coil, and controlling means for said reclosing means, including a transformer having a secondary winding for actuating said closing coil, and a primary energizing winding for each circuit-section and constructed and arranged to energize said secondary winding effectively only when one circuit-section is energized and the other section is free from a condition which establishes an abnormal current flow in it.

11. The combination of an electric switch having means for connecting two circuit-sections, reclosing means for the switch including a closing coil, and controlling means for said reclosing means including a transformer having a secondary winding for actuating said closing coil, and a primary energizing winding for each circuit-section and constructed and arranged to energize said secondary winding effectively when either circuit-section is energized and the other section is free from a condition which establishes an abnormal current flow in it.

12. The combination of an electric switch having means for connecting two circuit-sections, reclosing means for the switch including a closing coil, and controlling means for said reclosing means including a transformer having a secondary winding for actuating said closing coil, a primary energizing winding for and influenced by the potential of each section, and constructed and arranged to energize said secondary winding effectively only when either section is energized at approximately normal potential and the other section is free from a short circuit and the connected load resistance is above a predetermined value.

13. The combination of an electric switch having means for connecting two circuit-sections, reclosing means for the switch including a closing coil, and a transformer having a secondary winding for actuating the closing coil, a primary energizing winding influenced by one circuit-section, and a third winding influenced by the other circuit-section and controlled by a condition establishing an abnormal current flow in its circuit-section to control the magnetic coupling between said primary and secondary windings and de-energize said secondary winding and prevent the energization of said closing coil.

14. The combination of a switch having means for connecting two circuit-sections, and means controlling said connecting means including a transformer having an actuating secondary winding for governing the operation of said connecting means, a primary energizing winding influenced by one circuit-section, and a third winding influenced by the other circuit-section and controlled by a condition establishing an abnormal current flow in its circuit-section to control the magnetic coupling between said primary and secondary windings and de-energize said secondary winding and prevent the closing of the switch.

15. The combination of an electric switch having means for connecting two circuit-sections, and means controlling said connecting means including a transformer having a secondary winding governing said connecting means and an energizing primary winding for each circuit-section governing the magnetic coupling between said secondary winding and the other energizing primary winding and de-energizing said secondary winding and preventing the closing of the switch while an abnormal current flows in one of said primary windings.

16. The combination of an electric switch having means for connecting two circuit-sections, and means controlling said connecting means including a transformer having a secondary winding governing said connecting means and an energizing primary winding for each circuit-section arranged to de-energize said secondary winding when one circuit-section is energized and the other section is subjected to a condition establishing an abnormal current flow in it.

17. The combination of an electric switch having means for connecting two circuit-sections, and means controlling said connecting means including a transformer having a secondary winding governing said connecting means and an energizing primary winding for each circuit-section, either of which primary windings is adapted to act as a secondary for the other and de-energize said governing secondary winding when subjected to a condition establishing an abnormal induced current flow therein.

18. The combination of an electric switch having means for connecting two electrically independent circuit-sections, a power source arranged to separately energize said sections, means governed by an abnormal condition in one of the electrically independent circuit-sections to effect the opening of the switch, and means to effect the closing of the switch when either only of the two circuit-sections is connected with its power source and is energized at approximately normal potential and the other electrically independent circuit-section is disconnected from its power source and is free of a condition establishing an abnormal current flow therein.

19. The combination of an electric switch having means for connecting two circuit-sections which are adapted to be separately energized from a power source, an under-voltage coil responsive to the voltage of one of the sections for effecting the opening of the switch upon a reduction of voltage of a section, mechanism for effecting the closing of the switch including a closing coil, and transformer means responsive to conditions in both sections for energizing said closing coil and effecting the closing of the switch when either circuit only is electrically connected with its power source and is energized at approximately normal potential and the other circuit is free from a condition which establishes an abnormal current flow therein.

20. The combination of an electric switch having means for connecting two circuit-sections, an under-voltage coil for effecting the opening of the switch, a closing coil for effecting the closing of the switch, a transformer having two primary windings influenced by the potentials in the circuit-sections, and a secondary winding common to said two primary windings and governing the operation of said under-voltage and closing coils.

21. The combination of an electric switch having means for connecting two circuit sections, means for impressing a test potential on one section from the other normally-energized sections while maintaining the sections electrically independent, and means to close the switch and connect the circuit sections when the current flow due to the test potential is less than a predetermined value.

22. The combination of an electric switch having means for connecting two circuit sections, means for impressing a test potential on either section from the other section when it is normally energized while maintaining the two sections electrically independent, and means to close the switch and connect the circuit sections when either section is energized at approximately normal potential and the current in the other section due to the test potential is less than a predetermined value.

23. The combination of an electric switch for connecting two circuit-sections, and means controlling said switch including two inductively-coupled windings each energized from a separate section, means responsive to the magnetic flux of said windings arranged to effect the closing of the switch when either one and also both of said windings receive normal energization and to remain operatively uninfluenced by the flux of said windings when one of said windings is close-circuited.

24. A circuit controlling device including a transformer having a magnetic core, two primary windings and a secondary winding thereon, and circuit controlling means operated by an operating current in said secondary winding, said transformer having such magnetic leakage that when either one of said primary windings is substantially close-circuited while the other primary winding is energized at normal potential, flux is diverted away from said secondary winding so that less than the operating current is induced therein.

In testimony whereof, I have signed my name to this specification.

JOSEPH D. WOOD.